March 1, 1966

J. HAMPL 3,238,007

MOTION PICTURE CAMERA

Filed May 22, 1963

INVENTOR.
Jan Hampl
BY Richard Clund
Agt

March 1, 1966          J. HAMPL          3,238,007
MOTION PICTURE CAMERA
Filed May 22, 1963          5 Sheets-Sheet 2
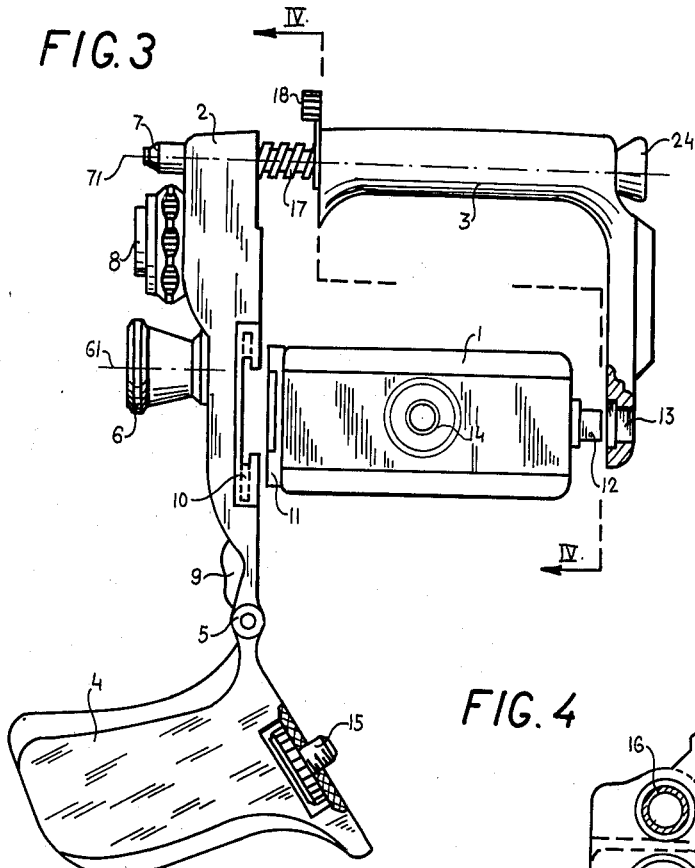
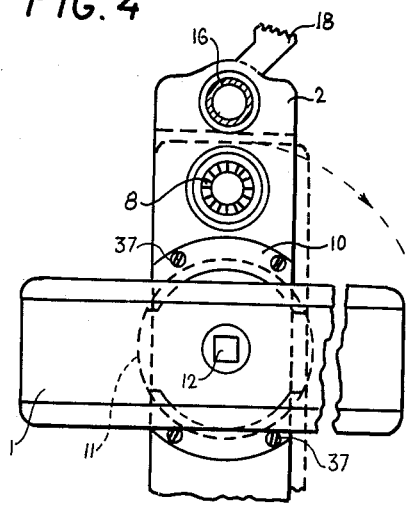
INVENTOR.
Jan Hampl March 1, 1966 J. HAMPL 3,238,007
MOTION PICTURE CAMERA
Filed May 22, 1963
5 Sheets-Sheet 4

INVENTOR.
Jan Hampl
BY
Richard Grub
Agt

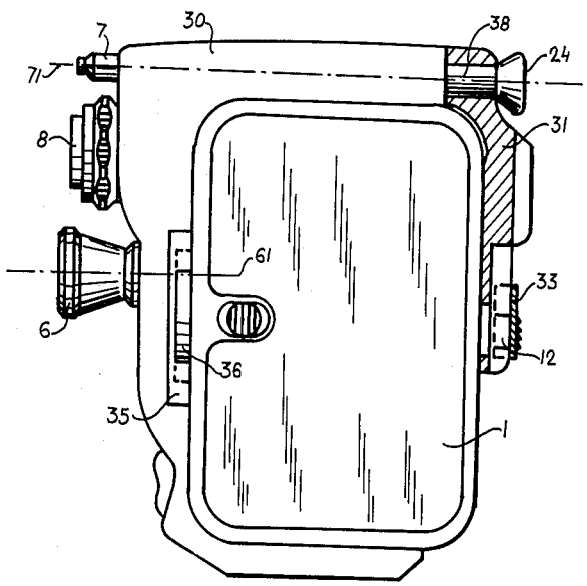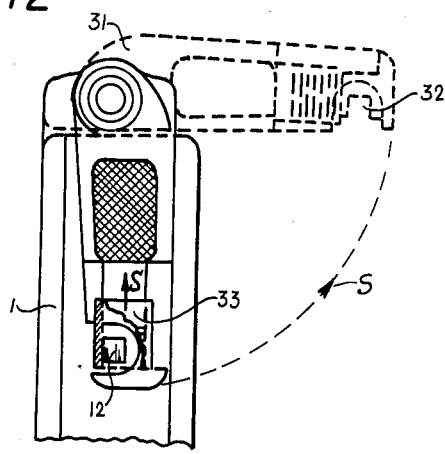

United States Patent Office 3,238,007
Patented Mar. 1, 1966

3,238,007
MOTION PICTURE CAMERA
Jan Hampl, Prerov, Czechoslovakia, assignor to Meopta, narodni podnik, Prerov, Czechoslovakia
Filed May 22, 1963, Ser. No. 282,259
Claims priority, application Czechoslovakia, June 1, 1962, 3,371/62
15 Claims. (Cl. 352—72)

This invention relates to motion picture cameras, and more particularly to motion picture cameras of the type in which the film is contained in a chamber releasably attached to a supporting frame which at least partly surrounds the film chamber and carries the optical system.

In known motion picture cameras of the described type, difficulties are sometimes encountered during removal and insertion of the film chamber because of jamming of the chamber in the guides which lead the chamber toward and away from its operating position adjacent the optical system of the camera. Proper alignment between the optical system and the film chamber is impaired if the guides wear after repeated jamming.

The object of this invention is a motion picture camera which retains the desirable properties of the known camera, yet avoids it shortcomings.

A more specific object is the provision of a motion picture camera in which the film chamber is aligned with the optical system without danger of wear and subsequent misalignment in use.

Another object is the provision of a camera of the type discussed in which the film is precisely positioned in the focal plane of the optical system.

A further object is the provision of a camera in which a film mounted in a film chamber may be placed close to the rear element of the optical system so as to permit the use of rear elements of short focal length and the use of wide-angle lenses.

With these and other objects in view, the invention in one of its aspects provides a camera including a support structure, a lens mounted on the support structure, and a film chamber adapted to hold motion picture film and provided with an aperture for exposure of the film. The chamber is releasably secured to the support structure so as to be capable of rotary movement relative to the support structure toward and away from an operative position in which the optical axis of the lens passes through the chamber aperture. Means are provided on the support structure for arresting the rotary movement of the film chamber in the operative position thereof.

The exact nature of this invention as well as other objects and advantages thereof will be readily apparent from consideration of the following specification relating to the annexed drawing in which:

FIG. 3 shows the principal elements of the camera of FIG. 1 in a disengaged condition;

FIG. 4 is a partly sectional fragmentary rear elevational view of the apparatus of FIG. 3 taken on the line IV—IV;

Figure 1:
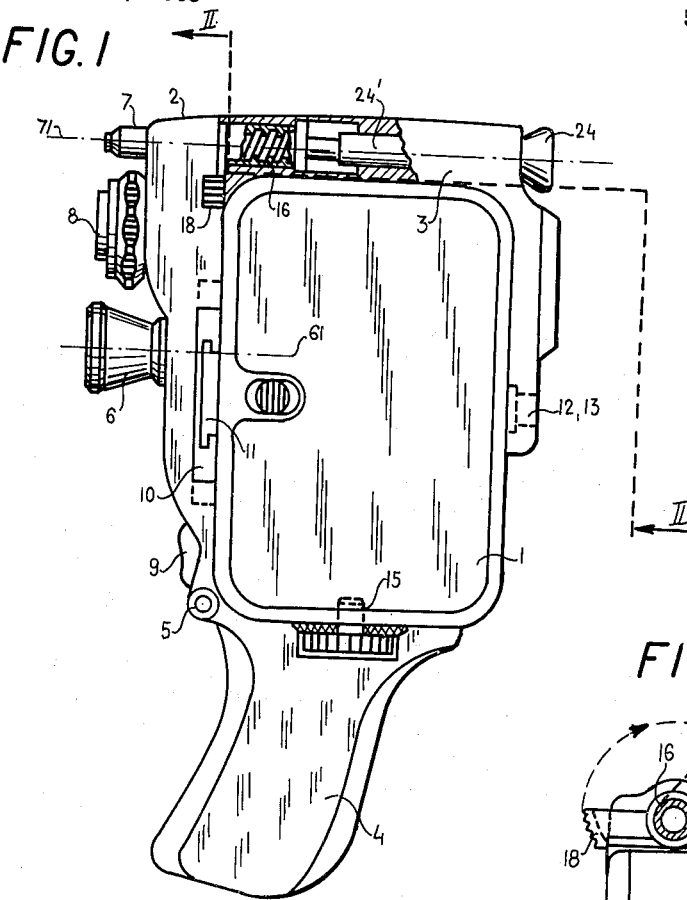
FIG. 1 shows a motion picture camera of the invention in side elevation, portions of the structure being broken away in order to reveal internal working parts.
Figure 2:
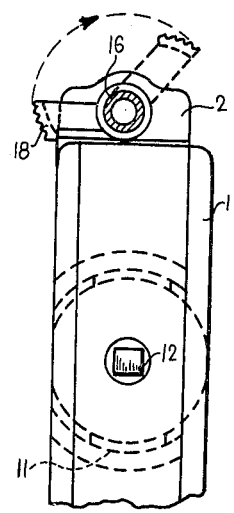
FIG. 2 is a fragmentary rear elevational view of the apparatus of FIG. 1, partly taken in section on the line II—II.
Figure 5:
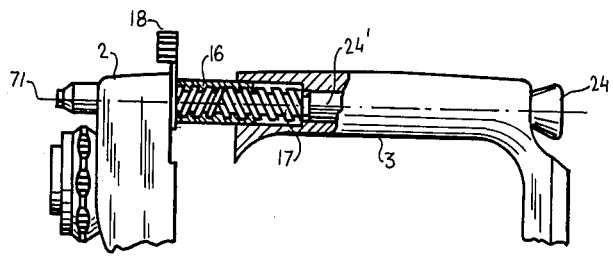
Figure 6:
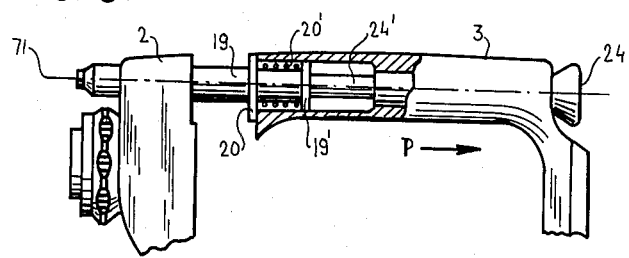
Figure 7:
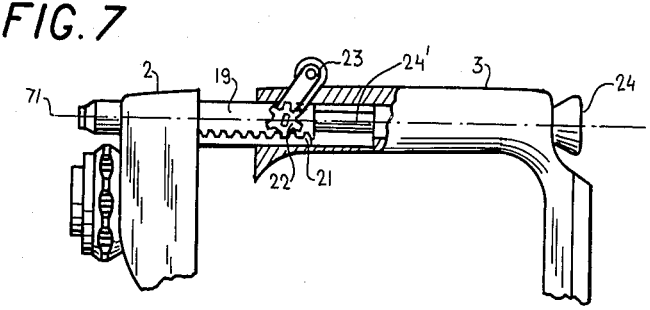
Figure 8:
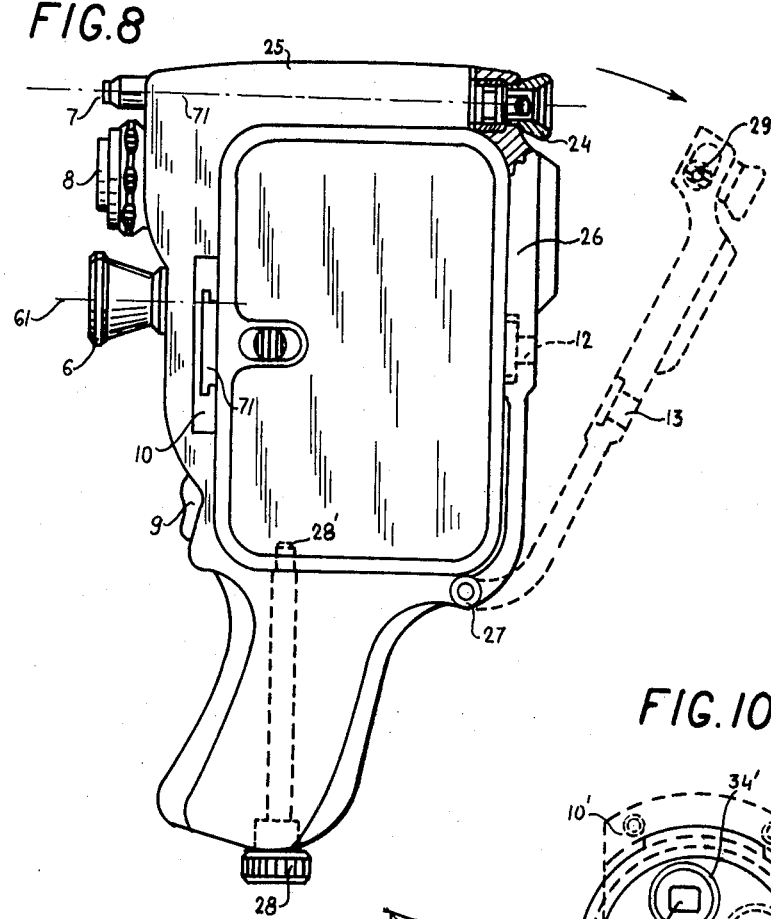
Figure 10:
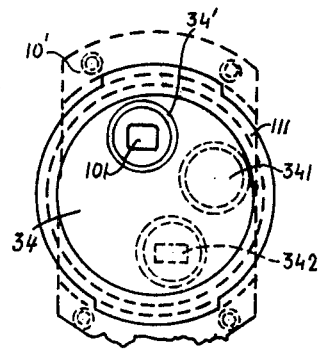
Figure 9:
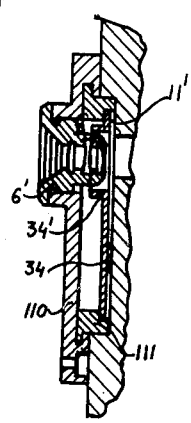

FIGS. 5, 6, and 7 illustrate modifications of a portion of the apparatus of FIGS. 1 to 4 in views corresponding to a portion of FIG. 3;

FIG. 8 shows another embodiment of the camera of the invention;

FIG. 9 shows a modified detail of any one of the cameras disclosed, the view being in side elevational section through the optical axis of the camera;

FIG. 10 is a front elevational view of an element of FIG. 9;

FIG. 11 shows a further embodiment of the invention in a view corresponding to that of FIG. 1; and FIG. 12 shows the camera of FIG. 11 in fragmentary rear elevation.

Referring now to the drawing in detail, and initially to FIGS. 1 to 4, there is seen a motion picture camera including a film chamber 1. In the assembled condition of the camera illustrated in FIGS. 1 and 2, the chamber 1 is partly enveloped by a supporting frame structure. The frame includes a front portion 2 which carries the camera lens assembly 6, and a top portion 3 which is movable toward and away from the front portion in a direction parallel to the axis 61 of the optical system 6. A part of the frame portion 3 extends downwardly beyond the optical axis 61. A bottom portion 4 which also constitutes a grip is hinged to the front portion 2 by a pivot pin 5. A view-finder is arranged above the chamber 1 in such a manner that its objective 7 projects forward from the front portion 2, and its eye-piece 24 projects rearward from the top portion 3. In the position of the camera illustrated in FIG. 1, the objective 7 and eye-piece 24 are connected by bores in the frame portion 2, 3 and by a barrel 24' aligned along the optical axis 71 of the view-finder.

The front portion 2 carries the sensing element 8 of a photoelectric exposure control device which may be arranged to give an indication of proper lens diaphragm setting or to control the lens diaphragm automatically in response to the intensity of the received light. Since exposure control devices are known in themselves and not directly relevant to this invention, the iris diaphragm of the lens system 6 and the motion transmitting train connecting it to the sensing element 8 have not been shown in the drawing.

The front portion 2 of the camera frame also carries a trigger 9 which releases the motor of a film transport and shutter arrangement mounted in the chamber 1 in a known manner not itself relevant to the invention, and not illustrated for this reason.

The chamber 1 is attached to the front portion 2 of the frame by a bayonet joint whose socket member 10 is attached to the front portion 2 by means of screws 37 (FIG. 4), whereas the plug member 11 of the joint is arranged on the front face of the film chamber 1. The axis of relative rotation of the two bayonet joint members is parallel to the optical axis 61 of the lens system 6, and radially spaced therefrom in a downward direction. As square stub shaft 12 coaxial with the bayonet joint 10, 11 is rotatably mounted on the narrow rear face of the chamber 1, and is conformingly received in a recess 13 of the top frame portion 3.

Rotation of the chamber 1 about the common axis of the bayonet joint 10, 11 and of the shaft 12 is prevented by an arresting screw 15 rotatably mounted on the bottom portion 4 and threadedly engaging a connector plate 14 on the bottom of the chamber 1. The knurled head of the screw 15 projects laterally from the grip 4. A sleeve 16 is rotatably mounted on the top frame portion 3. It is internally threaded, and the threads of the sleeve 16 are engaged by a threaded tubular member 17 fixedly attached to the front frame portion 2. An operating arm 18 is attached to the sleeve 16 for rotating the same. The sleeve 16 and tubular member 17 are coaxial with the view-finder.

The afore-described apparatus is operated as follows:
When it is desired to disengage the film chamber 1 from the camera frame, the arresting screw 15 is withdrawn from the bottom of the film chamber 1. The bottom part 4 is pivoted away from the chamber 1. The arm 18 is then swung about the optical axis 71 of the view-finder to move the top frame portion 3 from the position illustrated in FIG. 1 to that shown in FIG. 3, and to thereby release the stub shaft 12 from the recess 13. The chamber 1 is pivoted about the axis of the bayonet joint until the plug member 11 moves from the secured position seen in FIG. 2 to the released position evident in FIG. 4. The film chamber 1 may then be withdrawn rearwardly from the front frame member 2, and the chamber 1 may be replaced by another one holding film of different speed or of different color sensitivity.

To install a film chamber 1 in the frame 2, 3, 4, the afore-described sequence of steps is reversed. The bayonet joint 10, 11 is first engaged and locked by rotation of the chamber 1 about its horizontal axis. The arm 18 is swung about the optical axis 71 of the view-finder until the stub shaft 12 is fully received in the recess 13. The grip 4 is swung toward the chamber 1, and the screw 15 is threaded into the connector plate 14 to arrest rotation of the chamber in a position in which its film-exposing aperture is aligned with the optical axis 61.

FIGS. 5, 6 and 7 illustrate modified connections between the front frame member 2 and the top member 3. In the camera frame partly illustrated in FIG. 5, the sleeve 16 is rotatably mounted on the front portion 2, whereas the threaded tubular member 17 is coaxially fixed to view-finder barrel 24'. The arrangement is otherwise the same as in FIGS. 1 to 4.

In the embodiment of the invention partly shown in FIG. 6, a cylindrical tube 19 coaxial with the view-finder is fixedly attached to the front frame portion 2. Its free rear end carries an annular flange 19'. The bore of the top portion 3 opposite the front portion 2 is covered by a fixed annular washer 20. A helical compression spring 20' is coiled about the free end of the tube 19 between the flange 19' and the washer 20, thereby urging the tube 19 to move inward of the bore in the top portion 3 for telescoping engagement with the view-finder barrel 24'. The spring 20' thus urges the top portion 3 into abutment against the front portion 2 and into a position corresponding to that illustrated in FIG. 1.

When it is desired to disengage the stub shaft of a film chamber, not shown in FIG. 6, from the top frame portion 3, the top portion is pulled manually in the direction of the arrow P. Engagement of the stub shaft is achieved in an analogous manner by permitting the spring 20' to expand.

In the camera frame partly shown in FIG. 7 relative movement of the top frame portion 3 and the front portion 2 is actuated by turning a crank 23 connected to a pinion 22. The pinion is mounted for rotation about a fixed axis on the top frame portion 3 and meshes with a rack 21 fixedly attached to the front frame portion 2. The relative movement of the frame portions 2 and 3 is guided by the telescoping engagement of the view-finder barrel 24' with a cylindrical tube 19 in the manner described above with reference to FIG. 6.

The motion picture camera of the invention illustrated in FIG. 8 is closely similar in structure and operation to the camera shown in FIGS. 1 to 4, but it has a frame whose top, front, and bottom portions form an integral unitary structure 25 having the approximate shape of the letter C. A rear frame member 26 is attached to the lower rear end of the C-shaped frame structure by a hinge 27 which permits the rear frame member to be swung from the closed position shown in fully drawn lines in the direction of the arrow toward an open position illustrated in broken lines. The free end of the rear frame member 26 carries the eye-piece 24 of the view-finder and a latch 29 which is movable for locking engagement with the upper rear end portion of the C-shaped structure. A spindle 28 has a knurled head at the underside of the grip which is an integral portion of the C-shaped frame structure. The spindle is threadedly engaged in a normally vertical bore in the grip. In the position illustrated in FIG. 8, a smooth cylindrical end portion 28' of the spindle 28 engages a corresponding recess in the bottom of the chamber 1 to arrest the chamber in its operative position substantially as discussed with reference to FIG. 1.

Release of the film chamber 1 from the assembled position shown in FIG. 8 requires the withdrawal of the spindle 28, unlocking of the latch 29, release of the stub shaft 12 from the rear frame member 26 by pivoting movement of the latter, and disengagement of the bayonet joint 10, 11.

FIGS. 9 and 10 illustrate a modification of the camera of this invention which is available with the several supporting frame structures illustrated and described, but omitted from FIGS. 9 and 10 for the sake of clarity. The socket member 110 of the bayonet joint has a threaded opening which directly receives the threaded lens barrel 6' of the optical system. The plug member 111 is provided with an annular groove 11' in which a circular sealing plate 34 is rotatably received. A short tubular projection 34' about an opening in the sealing plate coaxially receives the free rear end of the lens barrel 6' in such a manner as to prevent passage of extraneous light to the aperture 101 of the film chamber 1 and to the non-illustrated film arranged behind the aperture for exposure to light passing through the barrel 6'.

When the chamber 1 is rotated with respect to the camera frame for disengagement of the bayonet joint, the sealing plate 34 is rotated by the lens barrel 6' on the chamber 1 into the position shown in FIG. 10 at 341 in broken lines. An imperforate portion of the sealing plate covers the aperture 101 and prevents loss of an openly exposed film frame. When the film chamber 1 is re-inserted in an inverted position for exposure of the second row of 8 mm. frames on a double 8 mm. film during reversed movement of the film, the tubular projection 34' is automatically moved by the engaged lens barrel 6' to the position 342 in which it exposes the film to light passing through the lens barrel and through a second aperture in the chamber 1 not shown in the drawing.

The modification of the camera of the invention illustrated in FIGS. 9 and 10 permits not only the quick interchange of several film chambers in the same camera frame, but also the convenient replacement of a lens assembly. Proper alignment of a film in the chamber 1 with the focal plane of the lens system in the barrel 6' is ensured by the direct engagement of the socket member 110 with the barrel 6' and the plug member 111. The fit of these elements is critical, but the dimensions of the remainder of the camera frame and most dimensions of the chamber 1 may vary within relatively wide tolerances without affecting the optical performance of the camera.

The motion picture camera illustrated in FIGS. 11 and 12 has a C-shaped frame member 30 which differs from the frame structure 25 of FIG. 8 only by the omission of an integral grip. The chamber 1 is rotatably and releasably secured by means of a connecting member 35 attached to the frame member 30 by non-illustrated screws in a manner evident from FIG. 4, and by a cylindrical member conformingly received in a recess of the connecting member 35 for rotation of the chamber 1 about the common axis of the members 35, 36 and of the stub shaft 12 on the rear wall of the chamber 1. The stub shaft is conformingly received in a recess 32 of a frame portion 31 mounted for pivoting movement about the axis 71 of the view-finder on a portion 38 of the view-finder barrel which projects rearward from the frame member 30. A locking member 33 on the free end portion of the frame member 31 may be shifted to engage the stub shaft 12, and thereby to prevent pivoting movement of the frame member 31.

When it is desired to release the film chamber 1 from its operative position shown in FIG. 11, a knurled portion of the locking member 33 is manually shifted toward the view-finder in the direction of the arrow S (FIG. 12), whereupon the frame portion 31 may be swung from the chamber retaining position shown in FIG. 12 in fully drawn lines to the chamber releasing position indicated in broken lines. An arresting screw similar to the screw 15 in FIG. 1 has been omitted from the showing of FIG. 11. The screw is withdrawn next from the chamber 1. The connecting members 35, 36 may then be disengaged from each other by relative axial and rotary movement.

The rotatable connections between the film chamber and the lens carrying supporting frame in the cameras of the invention are virtually incapable of jamming. The slidingly engaged surfaces of the members 10, 11 and 35, 36 which constitute the connections are relatively large, and thus distribute the contact pressure so as to eliminate significant wear during the normal useful life of the camera. Both types of connections precisely locate the axis of rotation of the film chamber. An arresting pin or the like is all that is needed to precisely align the optical axis of the lens system with the center of the film chamber aperture, and the film gate of the chamber.

The film chamber aperture is brought forward as close to the rear element of the lens system as may be desired. The camera of this invention is well suited for use with wide angle lenses and with other lenses having rear elements of short focal length. The broad radial faces of the bayonet joint 10, 11 and of the rotatable member 35, 36 provide abutments which ensure precise positioning of the film in the focal plane of the lens system over a long period of camera use.

Precise positioning of the film in the focal plane of the lens system is assisted by the backing given the film chamber 1 by the top frame member 2. The top member 2 is pushed tight against the back wall of the film chamber by means of the arm 18 (FIGS. 1–5), by the spring 20′ (FIG. 6), or by the crank 23 (FIG. 7), the direction of top member movement being parallel to the optical axis 61 of the camera lens system 6. The removal of the film chamber 1 from its operative position also involves a movement in the direction of the optical axis 61 as will be best seen in FIG. 3, and such movement may be preceded by a rotary movement.

Various modifications are contemplated and may be obviously resorted to by those skilled in the art without departing from the spirit and scope of the invention as hereinafter defined by the appended claims as only preferred embodiments thereof have been disclosed.

What is claimed is:

1. A motion picture camera comprising, in combination:
    (a) a film chamber formed with an aperture for exposure of a film held therein;
    (b) frame means including a plurality of frame members movable relative to each other toward and away from a chamber securing position,
        (1) said frame members in said position thereof extending in a common plane, and defining an opening through said frame means transverse of said plane and dimensioned conformingly to receive said chamber for preventing movement thereof in said plane;
    (c) lens means mounted on one of said frame members and having an optical axis substantially parallel with said plane; and
    (d) securing means for releasably securing said film chamber to said one frame member while said frame members are away from said position thereof, the film chamber secured by said securing means being adapted to be received in said opening when said frame members move into said position thereof.

2. A camera as set forth in claim 1, wherein said securing means secure said film chamber to said one frame member for rotary movement about an axis of rotation toward and away from an operative position in which said optical axis passes through said aperture, the camera further comprising arresting means on one of said frame members for preventing rotary movement of said chamber away from said operative position in said position of said frame members.

3. A camera as set forth in claim 2, further comprising coupling means for coupling said aperture to said lens means in light tight engagement in the operative position of said chamber, and for closing said aperture when said chamber moves away from the operative position thereof.

4. A camera as set forth in claim 1, wherein said frame members are movable toward and away from said position in said plane.

5. A camera as set forth in claim 1, wherein said one frame member is pivotally connected to another frame member for movement toward and away from said chamber securing position.

6. A camera as set forth in claim 5, further comprising a view-finder having a barrel mounted on said one frame member, said other said frame member being pivotally fastened to said viewfinder barrel.

7. A camera as set forth in claim 1, wherein said securing means includes a bayonet joint having a socket member and a plug member, one of said members of the joint being mounted on said one frame member and the other member of the joint being mounted on said chamber.

8. A camera as set forth in claim 1, wherein said securing means includes two connecting members, one of said members being formed with a cylindrical recess, and the other member being cylindrical and adapted to be conformingly received in said recess, said connecting members being respectively mounted on said one frame member and on said chamber.

9. A motion picture camera comprising, in combination:
    (a) a camera frame body including a plurality of frame members movable toward and away from a chamber retaining position;
    (b) lens means having an optical axis and mounted on one of said frame members;
    (c) a film chamber having an optical axis;
    (d) engaging means on said one frame member and on said chamber engageable for guiding rotary movement of said chamber relative to said one frame member about an axis of rotation toward and away from a position of alignment of said optical axes; and
    (e) securing means for securing said frame members in said chamber retaining position, said frame members when in said position thereof retaining said film chamber in said position of alignment relative to said one frame member.

10. A camera as set forth in claim 9, wherein said axis of rotation is substantially parallel to said optical axes when the same are aligned.

11. A camera as set forth in claim 9, further comprising means connecting said one frame member to another frame member for relative movement in the direction of the optical axis of said lens means.

12. A camera as set forth in claim 9, wherein said engaging means include a first connecting member fixedly fastened to said film chamber, and a second connecting member conformingly engageable with said first member, said second member being fastened to said one frame member; and said lens means including a lens barrel mounted on said second member.

13. A camera as set forth in claim 12, further comprising interengaging threads on said barrel and on said second connecting member.

14. A camera as set forth in claim 12 further comprising a diaphragm formed with an opening therein, said diaphragm being mounted on said first connecting member for rotation about said axis of rotation toward and away from a position in which said opening is aligned with said optical axes.

15. A camera as set forth in claim 14, further comprising coupling means on said diaphragm and on said second connecting member for coupling said diaphragm to said second connecting member in alignment of the optical axis of said lens means with said opening in said diaphragm during said rotary movement of said chamber relative to said one frame member.

References Cited by the Examiner

UNITED STATES PATENTS 2,948,204   8/1960   Kopp et al. _____ 352—77 X
3,166,756   1/1965   Hampl _____ 352—78

NORTON ANSHER, *Primary Examiner.*

WILLIAM MISIEK, *Examiner.*